United States Patent
Morrill, Jr.

[11] Patent Number: 5,991,749
[45] Date of Patent: Nov. 23, 1999

[54] WIRELESS TELEPHONY FOR COLLECTING TOLLS, CONDUCTING FINANCIAL TRANSACTIONS, AND AUTHORIZING OTHER ACTIVITIES

[76] Inventor: Paul H. Morrill, Jr., P.O. Box 244, 206 Jefferson St., Delaware City, Del. 19706-0244

[21] Appl. No.: 08/929,217

[22] Filed: Sep. 9, 1997

Related U.S. Application Data

[60] Provisional application No. 60/020,312, Sep. 11, 1996.
[51] Int. Cl.⁶ .......................... G06F 15/30; G06F 15/20; G06F 15/21; H04M 11/00
[52] U.S. Cl. ............................. 705/44; 705/13; 705/39; 705/40; 705/42
[58] Field of Search ............................ 705/13, 39, 40, 705/42, 44

[56] References Cited

U.S. PATENT DOCUMENTS

| | | | |
|---|---|---|---|
| 3,652,795 | 3/1972 | Wolf et al. | 379/91.01 |
| 4,320,387 | 3/1982 | Powell | 340/825.34 |
| 4,341,951 | 7/1982 | Benton | 705/41 |
| 4,845,636 | 7/1989 | Walker | 364/479.07 |
| 4,926,325 | 5/1990 | Benton et al. | 705/39 |
| 4,960,981 | 10/1990 | Benton et al. | 705/41 |
| 5,025,373 | 6/1991 | Keyser, Jr. et al. | 380/24 |
| 5,157,717 | 10/1992 | Hitchcock | 379/93.19 |
| 5,383,113 | 1/1995 | Kight et al. | 705/40 |
| 5,465,206 | 11/1995 | Hilt et al. | 705/40 |
| 5,485,370 | 1/1996 | Moss et al. | 395/200.47 |
| 5,727,163 | 3/1998 | Bezos | 705/27 |
| 5,751,973 | 5/1998 | Hassett | 705/13 |
| 5,787,403 | 7/1998 | Randle | 705/43 |

FOREIGN PATENT DOCUMENTS 131906  1/1985  European Pat. Off. .......... G07F 7/10

*Primary Examiner*—Allen R. MacDonald
*Assistant Examiner*—James W. Myhre
*Attorney, Agent, or Firm*—Connolly Bove Lodge & Hutz

[57] ABSTRACT

The following procedures describe the use of cellular telephones and other analog or digital wireless communication devices to conduct transactions and activities. These procedures effectively allow such devices to function as an electronic wallet, a wireless PIN pad, and a contactless Smart Card.

8 Claims, 13 Drawing Sheets

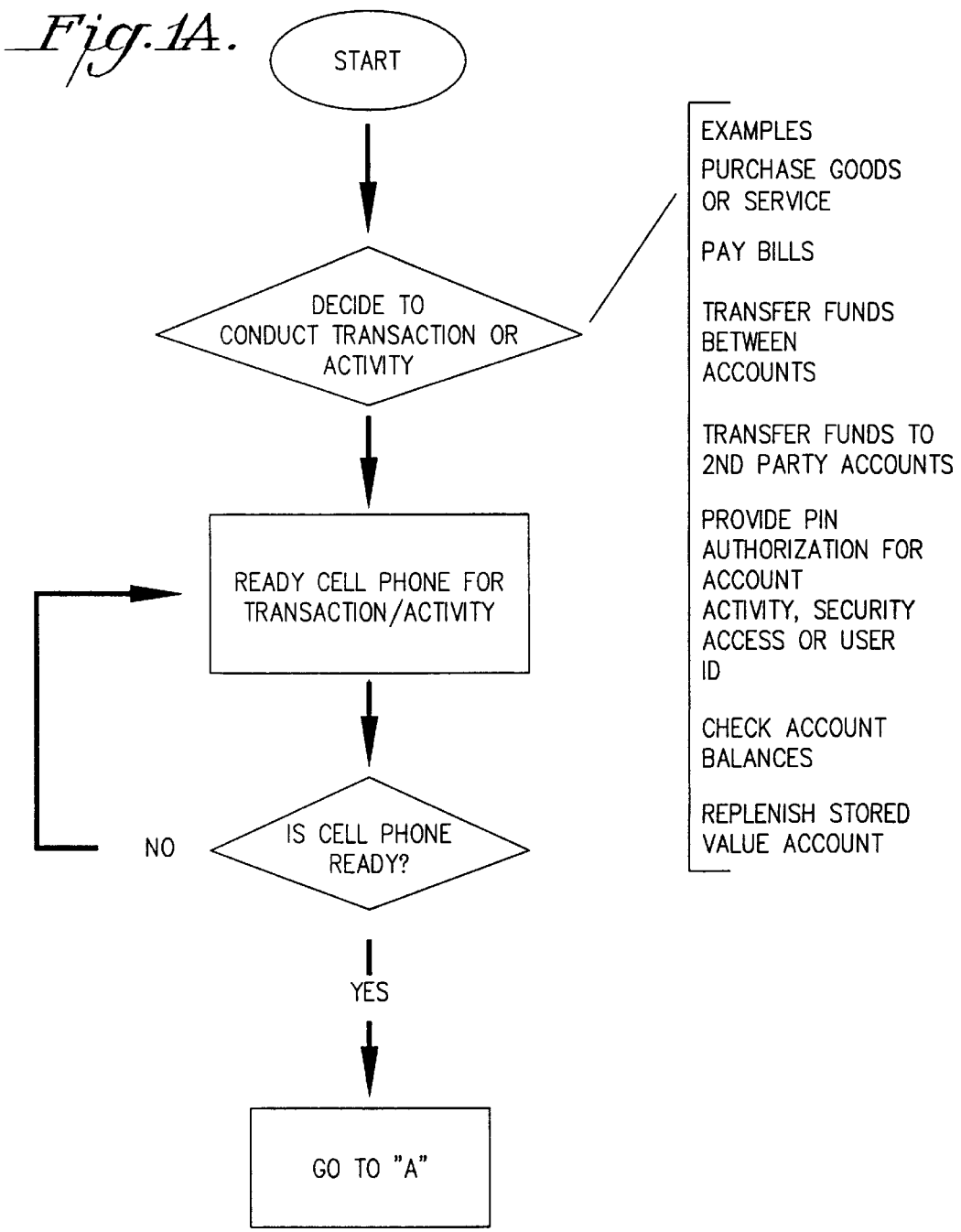

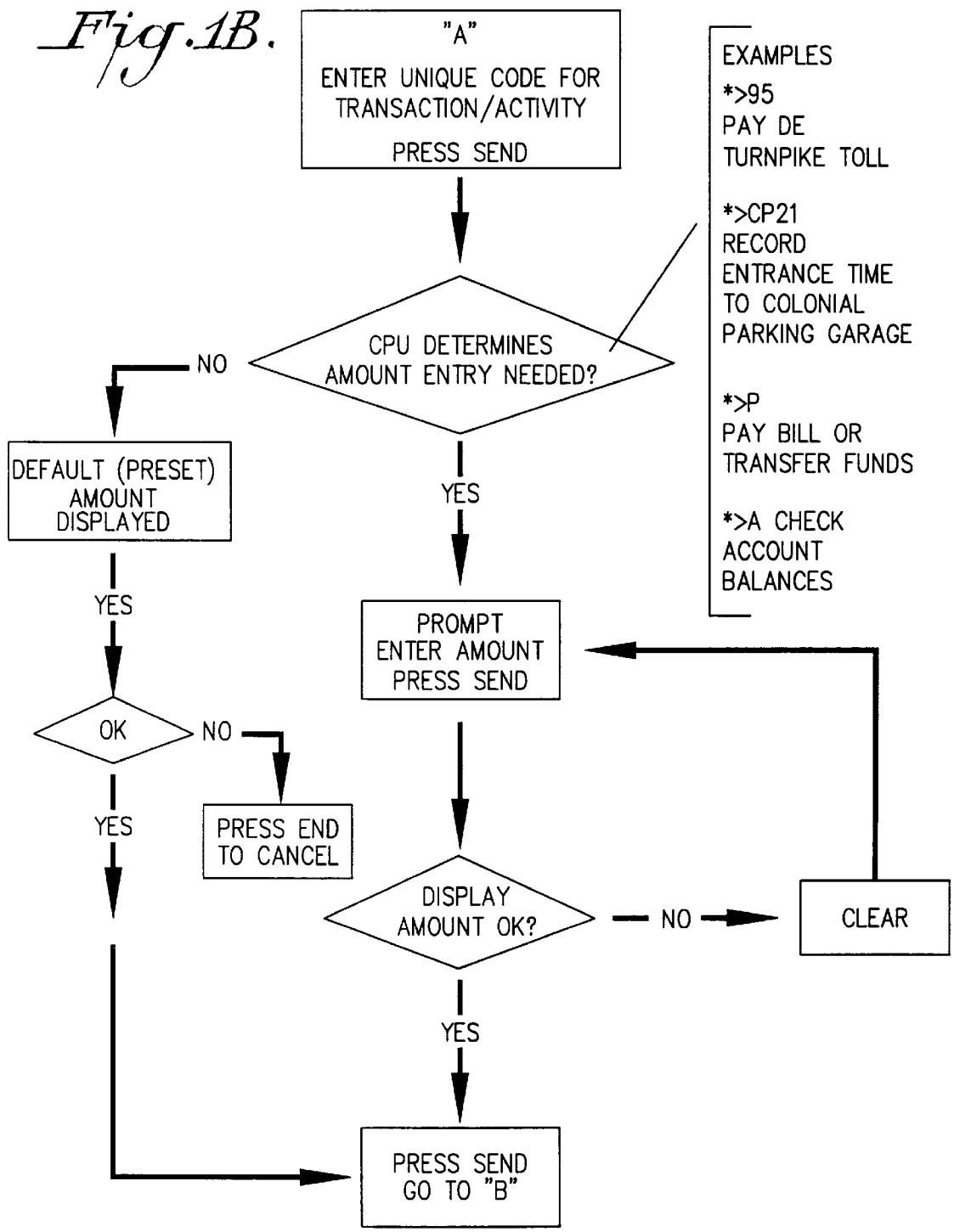

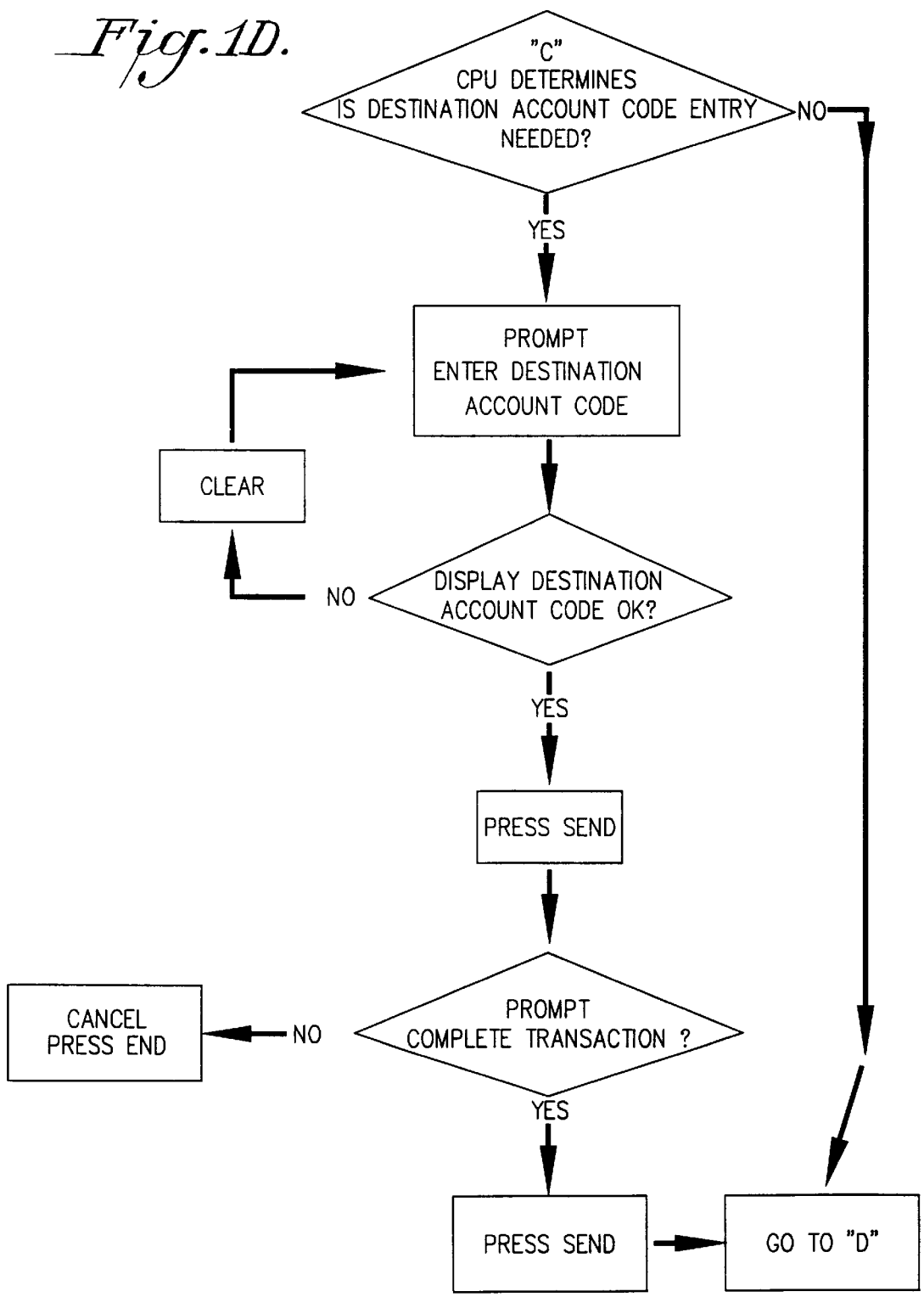

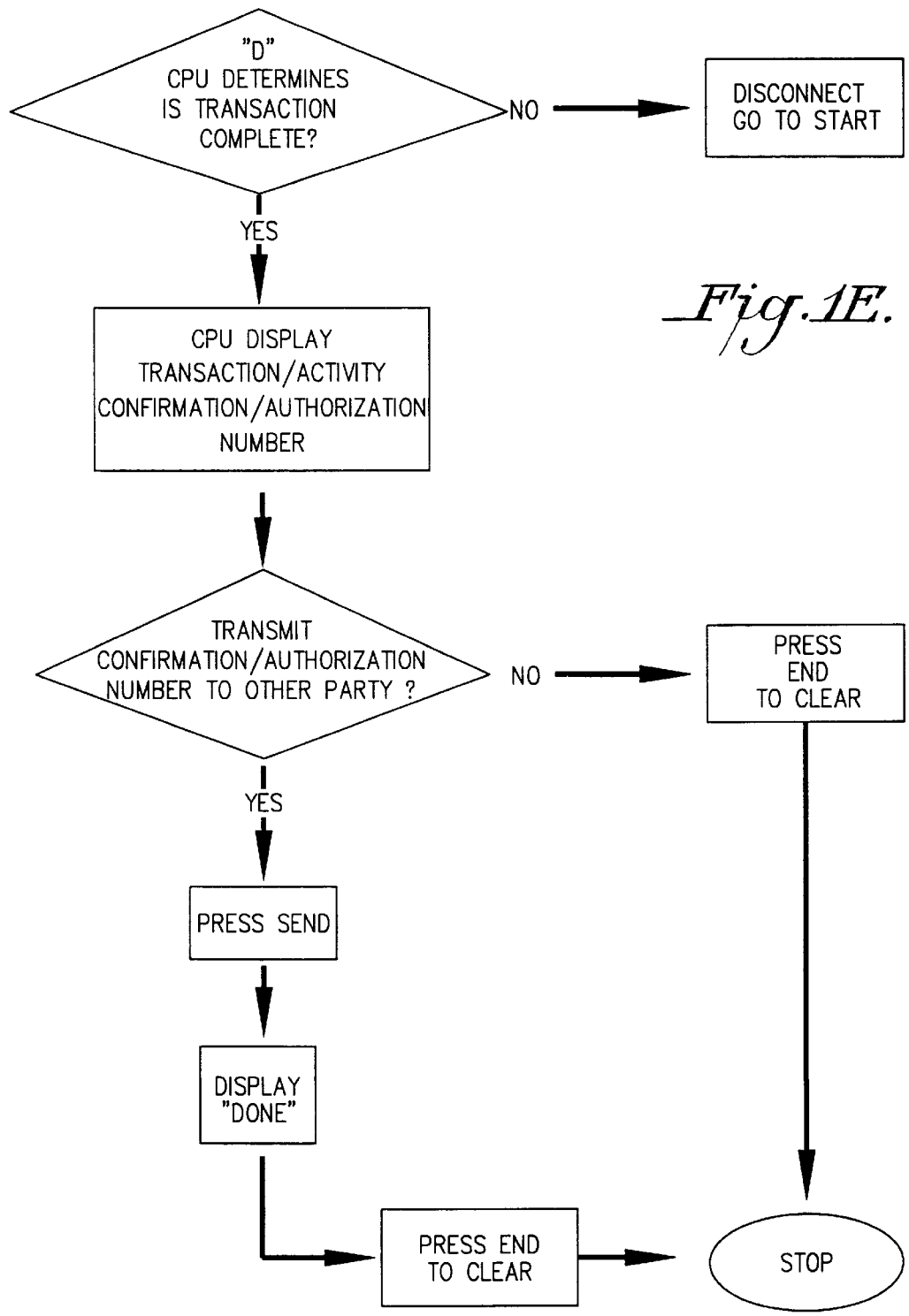

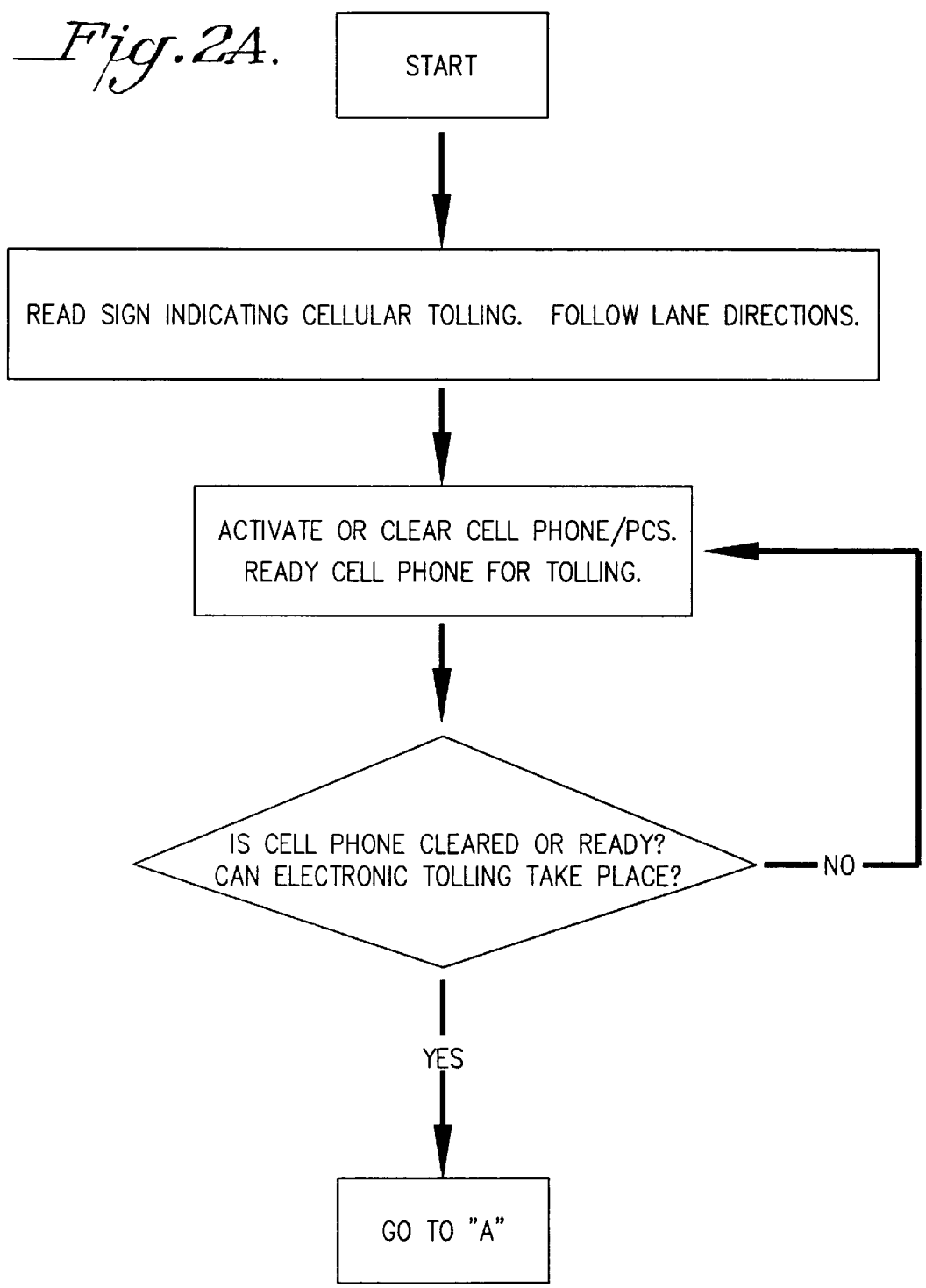

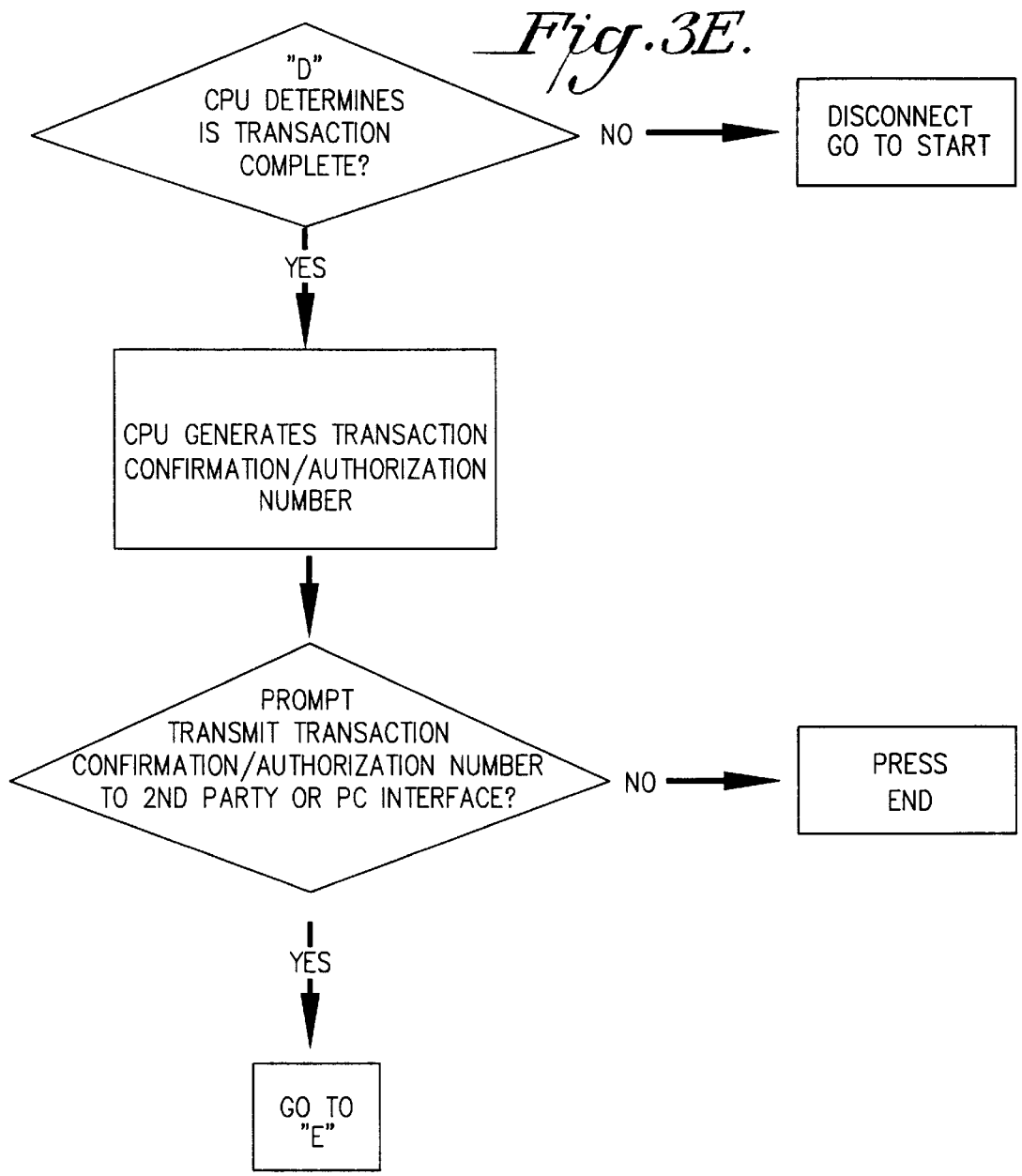

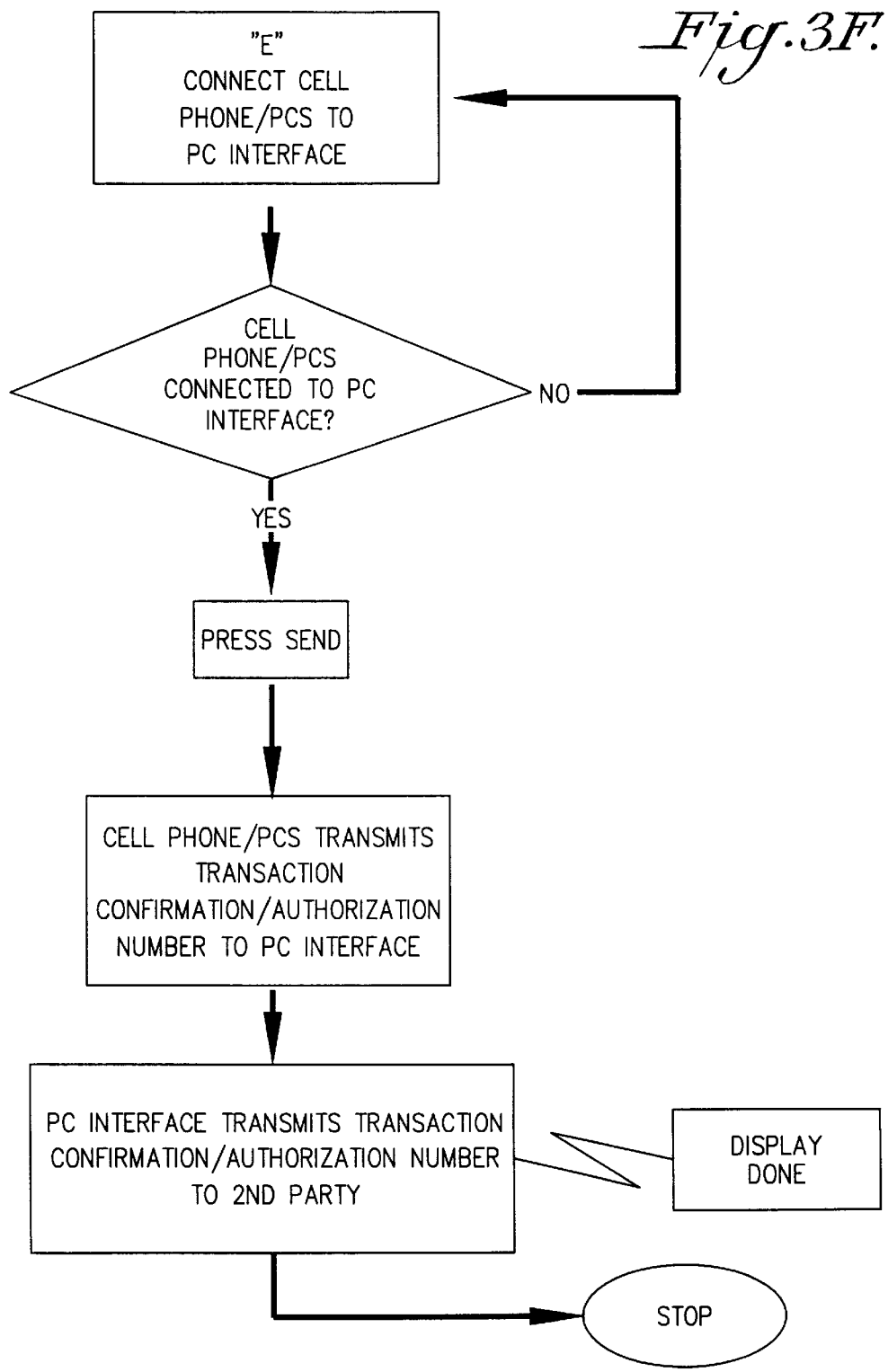

WIRELESS TELEPHONY FOR COLLECTING TOLLS, CONDUCTING FINANCIAL TRANSACTIONS, AND AUTHORIZING OTHER ACTIVITIES

CROSS-REFERENCE TO RELATED APPLICATION

The present application claims the benefit of provisional application Ser. No. 60/020,312 filed in the Patent and Trademark Office on Sep. 11, 1996.

BACKGROUND OF THE INVENTION

The present invention relates to methods of using a cellular phone or other wireless communication device to transfer funds between accounts, collect tolls and authorize other activities.

Prior to the present invention, cellular phones and/or other wireless communication devices have been used in a variety of different procedures involving the transfer of funds between different accounts. These procedures leave something to be desired in that they are unduly complicated and less convenient and/or less secure.

SUMMARY OF THE INVENTION

The present invention avoids the failings of the prior art by providing methods which are highly reliable and simple to follow.

In accordance with the present invention, a method is used to transfer funds between different accounts including the steps of expanding the function of a service provider's central processing unit to include account and authorization information, entering a function code on the keypad of a cellular phone or other wireless communication device, and sending the function code to the central processing unit. The central processing unit identifies the desired transaction and obtains authorization. The central processing unit determines the accounts involved in the transaction, and confirms completion of the transaction.

Preferably, the method includes the step of determining at the central processing unit whether a personal identification number is needed, and if so, the central processing unit is supplied with that number.

The desired transaction may involve a default amount at a pre-set price or a variable amount in which case such amount is identified and sent to the central processing unit.

Additionally, in accordance with the present invention, a method is used to verify identity and authorize access to a secured location. This method includes the steps of expanding the function of a service provider's central processing unit to include secure independent verification of a user's identity, and entering a function code on the keypad of a cellular phone or other wireless communication device. The function code is sent to the central processing unit of the provider which identifies the desired transaction as access to a secured location. The desired transaction is authorized and completion of the transaction is confirmed.

BRIEF DESCRIPTION OF THE PATENT DRAWINGS

Novel features and advantages of the present invention in addition to those mentioned above will become apparent to persons of ordinary skill in the art from a reading of the following detailed description in conjunction with the accompanying drawing wherein:

FIGS. 1A through 1E comprise flow diagrams illustrating a cell phone transaction/activity procedure, according to the present invention;

FIG. 2A and 2B comprise flow diagrams illustrating a cell phone/personal computer tolling procedure, according to the present invention; and FIG. 3A through 3F comprise flow diagrams illustrating a personal computer transaction/access security procedure, according to the present invention.

DETAILED DESCRIPTION OF THE INVENTION

Figure 1C:
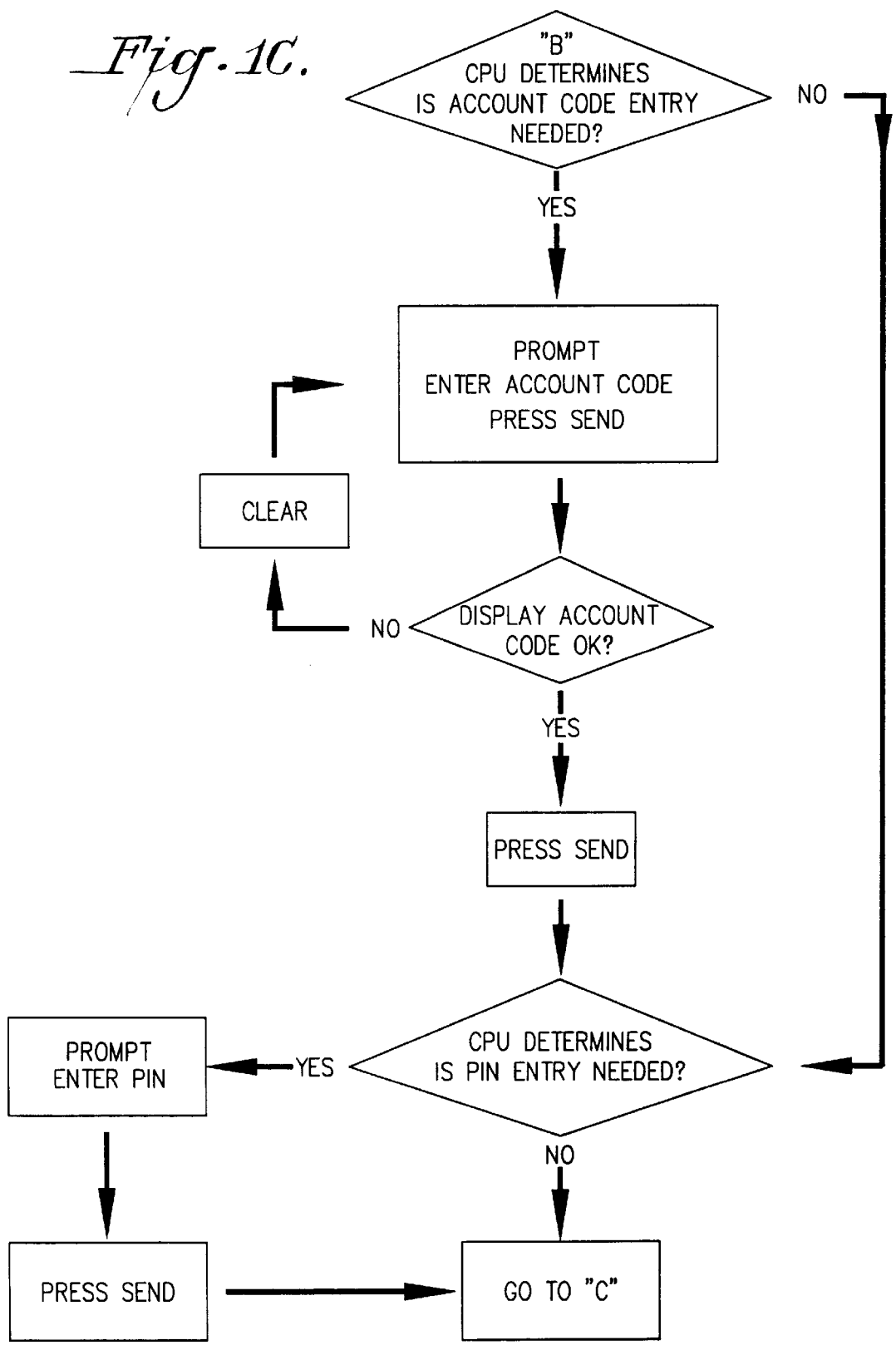

The method of the present invention may be used to conduct a number of transactions, as follows.

Cell Phone Financial Transaction Procedure

Referring in more particularity to FIGS. 1A–1E, the illustrated procedure allows a cellular phone or other wireless communication device to be used to transfer funds between accounts belonging to the same entity/person or to an account belonging to another party. Such transactions could include for example: purchasing a good or service by transferring funds (paying) to a second party's phone or financial account; or transferring funds between a person's credit accounts, from credit to debit or stored-value accounts, to, from, or between bank (saving or checking) accounts. Other activities could include checking balances in financial accounts. Communication takes place between the cellular phone and the mobile telephone service provider's cell antenna and thence via land line to a CPU.

The use of this procedure for these transactions allows the cellular phone to function as an electronic wallet or as a secure, automated account inquiry interface. This procedure is carried out by the user first entering a unique function code on the device's keypad to identify the type of transaction or activity desired and pressing "SEND." The mobile phone service provider's CPU identifies the desired transaction and determines if the transaction involves a default amount (as in a pre-set price for a specific highway toll plaza, transit fare, or vending machine), which is displayed on the phone's LED screen along with an "OK?" prompt. User presses "SEND" to continue or "END" to cancel.

If the transaction involves a variable amount (not a specific transaction with a pre-set default price), such as buying lunch or a souvenir from a street vendor, the CPU prompts the user to enter an amount, "SEND" it, then prompts "OK?" and the user presses "SEND" or clears and re-enters amount. The CPU then determines the types of user accounts to access for the type of transaction and displays either a default source account authorized to be debited (such as the customers mobile phone account), or prompts for a unique account code representing a specific credit card, debit card, bank, or other financial account. The mobile phone service provider CPU will have a linked record of the customer's pre-authorized financial account numbers and the customer's written authorization to debit/credit them. The account code is entered and the user presses "SEND."

The CPU then determines if the account/transaction protocol requires a personal identification number (PIN). To prevent unauthorized access and, if so, prompts for PIN. User enters PIN and presses "SEND." If the transaction type is not linked to a unique destination account by prior agreement between the mobile service provider and the 2nd party, the CPU prompts "PAY TO?" and the user enters the account code to which funds are to be transferred. This destination account code would be a unique vendor code (made known to the user verbally, by signage or by PC display), a unique user account code (in the case of an inter-account transfer by a single party), or the mobile phone number of the recipient.

The user enters the destination account code and presses "SEND." The CPU then prompts "OK to complete transaction?" and the user presses "SEND" to complete the transaction, or "END" to cancel. The CPU confirms completion of the transaction by generating and displaying a transaction confirmation/authorization number code. If the transaction involves a destination account not linked to the user (a second party's mobile phone account, for example) the CPU will prompt the user to transmit the transaction confirmation/authorization number by pressing "SEND." This number will display on the second party's mobile phone, if the phone is activated, and be transmitted to a pre-authorized computer account. Both parties press "END" to clear the cellular phones for other use.

This procedure permits face-to-face or remote transactions, with immediate confirmation to both parties, for example, the electronic equivalent of paying cash. The CPU debits and credits the appropriate accounts and creates an electronic record of the transfer. The transfer is reflected as a debit on the user's phone bill and as a credit on the recipient's mobile phone statement, along with any phone usage or transaction charges. If the mobile service provider has established a relationship and computer communication link with a bank clearinghouse, credit card issuer, or other financial institution and has the appropriate authorization from the account owner, debits and credits may instead be performed by those institutions and reflected directly on the user's and recipient's bank, credit card, or other periodic bill/statement, with only phone usage or transaction charges, if any, shown on the mobile phone statement.

In performing this procedure, the user may initially enter a unique function code which the CPU identifies as an activity, rather than a transaction, such as checking an account balance. The CPU determines if a PIN is required to prevent unauthorized access to the particular account and, if so, prompts "ENTER PIN. " The user enters PIN and presses "SEND." The remaining steps of this activity would be similar to existing touch tone telephonic automated information procedures, with prompts given visually on the mobile phone LED display, and/or orally by computer.

This procedure may also be used to allow a cellular phone to serve as a security access device. In this case the unique function code would tell the CPU to connect with the predesignated security system computer and prompt the user for the PIN or other access code sequence. The user enters the PIN and presses "SEND." The CPU forwards the authorization to the security computer, which then allows access. The system could allow access based solely upon receiving an authorized PIN or security access code from the user on any cellular phone, or could require that the access code be matched with the specific electronic signature of the cell phone registered to the user. This procedure could apply to a home, building, or area security system with a modem or RF receiver. If equipped with an antenna/receiver (or land line connection) and a processing chip, a garage opener or vehicle security system could also be activated/disarmed by cellular phone, using this procedure.

EXAMPLE 1

This example describes the implementation of the cell phone financial transaction procedure for the cash-equivalent purchase of a good or service. For such transactions, the cell phone functions as an electronic wallet, allowing the direct, secure transfer of money between two parties in lieu of cash. Funds are transferred (credited and debited) between the mobile phone accounts of the parties, or may be transferred between other pre-arranged financial accounts such as a credit card account to a bank account or vice-versa. Two cell phones may be used, one for each party to the transaction, or one phone may be used for both parties. The "payor" must initiate the transaction. For the greatest security, the "payor" must use his/her cell phone. This allows the mobile phone service provider to match the required PIN with the specific ID signal of the payor's cell phone. However, the service agreement between the mobile phone service provider and a customer could provide for account access from other cell phones, if both parties agree.

The payor's funds may be debited to the mobile phone account, from a stored value (pre-paid debit) account with the mobile phone service provider, or from any pre-arranged financial account, such as a bank savings or checking account, a credit card account, or brokerage account. The payor's service agreement with the mobile phone service provider will determine which accounts may be accessed for such transfers. The mobile phone service provider will require the service agreement to include the appropriate financial account number, if any, and written authorization by the customer to debit or credit the appropriate account when a transaction takes place using this procedure. The customer and the mobile phone service provider will jointly establish account codes and PIN that will be used by the customer to conduct an authorized transaction. The periodic billing statements from the mobile phone service provider will include a record of any financial transaction, including date, time, and general location, the nature of the transaction, the amount, the destination account name, the account code of the debited account (if other than the mobile phone account), and any air time or transaction charge which may apply.

Specifically, this example describes the use of the procedure to purchase a snack lunch from a vendor at an outdoor craft fair. The vendor must have either a mobile phone account or an arrangement with the mobile phone service provider to credit another cell phone or land line phone account on behalf of the vendor. The vendor may or may not have his/her mobile phone unit at the vending location. The purchaser must have a mobile phone service agreement and, in this case, have with him/her their cellular phone.

The purchaser selects the food desired and is told the amount due by the vendor ("payee"). The purchaser ("payor") activates and/or clears the cell phone for the transaction. The payor presses a function key and the transaction code for a "purchase" ie. a transfer of funds from his account to a second party's account. An example of such a function/transaction code entry might be "* P" (function key plus "P" for "pay bill/transfer funds"). The payor presses SEND. The mobile phone service provider's CPU receives the signal, which includes the ID of the sending phone. Based on this transaction code, the CPU prompts for an amount to be paid or transferred. In this case, the payor has purchased $4.50 worth of food and drink. He enters that amount and presses SEND. The CPU confirms amount and asks "OK?" and the payor presses SEND or clears and corrects the amount and presses SEND. (The payor may press END at any time to cancel the transaction.)

Depending upon the provisions of the service agreement between the customer and the mobile phone service provider, the CPU may then prompt for an account code, representing the account to be debited. This could be automatically set with a default account, such as the payor's mobile phone account, or could be open for any financial account linked via the service agreement with the mobile phone account. In the latter case, the CPU will next prompt for an account code. This code is a shortcut key sequence representing the actual bank or credit card account number, which is on file with the CPU. In this case, the payor has authorized the mobile service provider to debit his checking account and has established the "1" key as the code number representing his checking account. The payor enters "1" and presses SEND. The CPU displays confirmation of the choice of accounts (ie. "CHECKING") and asks "OK?" The payor presses SEND. Depending upon the account code and the service agreement, the CPU may prompt for a PIN. A PIN might not be required for a pre-paid (stored value) account with the mobile phone service provider up to a certain amount such as $20 or $50. But in this case, security requires a PIN. The payor enters his/her PIN and presses SEND. If the PIN corresponds with the cell phone ID, the CPU accepts the identity of the payor and prompts for a destination (to be credited) account code.

The destination account code will be determined by the service agreement, if any, between the mobile phone service provider and food vendor (payee). If the payee has a cell phone account, the mobile phone number could be the account number. Or, the vendor might establish a unique vendor account code (shortcut key sequence) with the mobile phone service provider. If the payee does not have an account with this mobile phone service provider, there would have to be a business agreement between the mobile phone service provider and the payee's mobile phone company (or land line telephone service provider). In the latter case, the destination account code might be the payee's home or business phone number.

In this case, the food vendor has a mobile phone account and has not established a unique vendor code. By signage or verbally, the payee informs the payor of his mobile phone number and the payor enters it at the destination account code prompt and presses SEND. The CPU displays the account code and asks "OK?" and the payor presses SEND to complete the transaction.

The CPU performs the transaction and displays a confirmation/authorization number/message. This number/message is a shorthand summary of the transaction amount and destination account. (An example of this confirmation number/message might be Jun. 20, 1996 $4.50 8818, this being the transaction date, amount, and last four digits of the destination phone number.)

The CPU will prompt the payor if he/she wants the confirmation/authorization number/message sent to the payee. In this case, the payee (the food vendor) has his mobile phone with him and has it activated. The payor presses SEND and the Confirmation is displayed on the payee's phone, so he knows the transaction is correct and has taken place. If the payee does not have a cell phone or does not have it with him, the payor could simply show the Confirmation message to the payee on his phone. To end the transaction, the payor presses END.

In this case the payor has elected to debit his checking account. The CPU will record the transaction and pursuant to the service agreement will direct the bank to debit/pay the appropriate accounts. The transaction will appear on the payor's next bank statement. The transaction will also appear on the payor's next cell phone statement. It might show the date, time, general (cell) location, type of transaction, destination account code/name, amount, and will include billing for any air time or transaction fee charged by the mobile phone service provider. If the payor had elected to debit his mobile phone account, the amount of the transaction would be added to the total due on his mobile phone bill.

The payee elected to have his mobile phone account credited for the transaction. His next mobile phone statement would include a record of the transaction and would show the amount of the transfer as a "credit" to his/her account. The credit could be used to offset the cost of mobile phone service, or could later be transferred to a bank account, using this procedure.

EXAMPLE 2

This example describes the implementation of the cell phone financial transaction procedure for the entrance time recording and exit payment by a parking facility customer. For these transactions under this procedure, the cell phone effectively functions as a transponder/identifier and as a contactless Smart Card or electronic wallet. This application of the procedure speeds through-put into and out of the facility, both for cash and card key customers. It is more convenient for the customer by not having to take a ticket to enter and handle cash to exit (or produce a card key). It greatly increases the number of customers a parking company can serve with automated equipment by expanding the market to include hourly users, not just monthly users. This makes elimination of cashier functions feasible, reducing personnel, cash handling, and theft costs. This application could also give the parking company the option of eliminating its monthly billing system and costs by transferring that function to the mobile phone service provider.

To allow the fullest use of this procedure, a parking facility with unattended entrances must have automatic gates which are controllable by computer. The computers may be at each gate control box or at a central location on or off site. The computers must be connected to a phone line or must be equipped with an RF antenna and receiver, so that they can receive information from the mobile phone service provider's CPU either by land line connection or wireless transmission. The procedure could, however, also be applied to attended, non-automated facilities as a means of reducing or eliminating cash transactions.

The parking facility operator will establish an account relationship with the mobile phone service provider. That relationship will define the financial arrangement between the parties relating to customer billing and transfers of payments to an account chosen by the parking provider. The relationship agreement will also establish the unique transaction codes to be used by cell phone users (parking customers) as they enter and exit the parking facility. The financial arrangement will determine, for example, whether customers will be billed by the parking provider, or whether the mobile phone service provider will cause customers to be billed through their cell phone statement or another financial account. Who is liable for, and the level of; any phone usage or transaction fees charged by the mobile phone service provider will also be determined by this financial arrangement.

The unique transaction codes to be used by customers under this procedure would be prominently displayed at the parking facility's entrance and exit gates. For the convenience and safety of customers trying to drive and operate the cell phone, the unique transaction code has as few digits as possible. It is a short-cut key sequence which tells the mobile phone service provider's CPU that this is an entrance/exit parking fee transaction for this particular parking facility and that the fee should be credited to a specific pre-authorized vendor account. Multiple facilities with differing rates would have different unique transaction codes. Different unique transaction codes might also be established for customers paying monthly rates. An example of a shortcut unique transaction code for this application might be *C1'31, meaning a function key (*)+vendor code (here CP for Colonial Parking)+facility ID number (3)+enter/exit code (1 for enter, 2 for exit).

The customer activates or clears the cell phone as he/she approaches the parking facility entrance. A sign announces the availability of pay-by-cell phone and displays the unique transaction code for the facility, which the customer enters on the cell phone and presses "SEND." The unique transaction code (e.g. *CP31) is transmitted to the mobile phone service provider CPU which records the user's identity, the date and time, and the transaction type—here "entrance into Colonial Parking facility number 3." The mobile phone service provider's CPU software records the transaction as "open" until the exit transaction code is received. The CPU generates a transaction confirmation/authorization code number, which is displayed on the user's cell phone. The user presses "END" to clear the phone.

The CPU sends the "entrance" transaction confirmation/authorization number to the parking facility operator's computer, which records the transaction for capacity control and other management reporting purposes and opens the automatic gate. This communication could be via land line, or by RF transmission if the gate or facility is not connected to the PSTN, but has an antenna and receiver.

When departing the parking facility, the user again activates and clears the cell phone as he/she approaches the exit gate. A sign displays the unique transaction code for the facility exit (e.g.*C1132) . The user enters the code and presses "SEND." The mobile phone service provider's CPU receives the code, records the user's identity, the date and time, the transaction type—here "exit from Colonial Parking facility number 3." The CPU searches for the "open" entrance transaction and matches it with the exit transaction, calculating the elapsed parking time. Depending upon the arrangement between the parking facility operator and the mobile phone service provider, the CPU may have the parking rates on file and may perform the billing calculation. If not, the CPU sends the user elapsed parking time to the parking facility computer for calculation and the parking facility computer returns the total of the charges to the mobile phone service provider's CPU.

The CPU displays the amount on the user's cell phone along with an "OK?" prompt. If OK' the user presses "SEND" to complete the transaction. The CPU sends the "exit" transaction confirmation/authorization number to the parking facility computer and displays it on the user's cell phone. The user presses "END" to clear the phone. The parking facility computer receives and records the transaction confirmation/authorization number and opens the exit gate.

The billing process will depend upon the arrangement between the parking facility operator and the mobile phone service provider. The customer may be billed directly by the parking facility operator or the charges debited from his/her pre-paid account with the parking facility operator. Alternatively, the arrangement may call for the mobile phone service provider to direct payment funds to the parking facility operator's account. The source of those payment funds will depend upon the service agreement between the customer and the mobile phone service provider and upon the account authorizations granted by the customer to the provider. The parking charges could be billed on the customer's periodic mobile phone statement or debited from a pre-paid mobile phone account. Or the charges could be debited from a pre-authorized credit card, debit card, or banking account and the transaction reflected on the periodic statements from those accounts. These accounts would be linked in the mobile phone service provider's CPU in accordance with the service agreement and signed customer account access authorizations on file.

The customer's mobile phone statement would reflect the transaction by type and date/time and would include any applicable mobile phone charge or other transaction fee.

In the case of an attended parking facility without computer controlled gates, the procedure can be applied in a variety of ways, depending upon the situation. The approaching driver could enter the unique "entrance" transaction code and when the transaction confirmation/authorization is displayed on the cell phone, show it to the attendant. The transaction confirmation/authorization number can be configured to include a vendor code reference so that the attendant knows the transaction is his. If the attendant is equipped with a cell phone, the mobile phone service provider's CPU could send the same transaction confirmation/authorization number to the attendant. When exiting, the user enters the "exit" transaction code and again shows the attendant the confirmation number, or the attendant has it displayed on his/her cell phone.

In the simplest case, if a "mom and pop" parking facility does not have a vendor relationship with the mobile phone service provider and a unique transaction code, it may still make use of this procedure, if it has a mobile phone account. The driver takes a time-stamped ticket upon entry and when ready to exit, the attendant computes the charges. The user "pays" for parking by entering the unique transaction code for "Pay a bill," enters the amount, and enters the parking facility's's mobile phone number as the destination account. The amount of the transaction would be credited to the parking facility operator's mobile phone statement. The user could show the attendant the transaction confirmation/authorization number on his/her cell phone, or it would be displayed on the attendant's phone, if available.

EXAMPLE 3

This example describes the application of the cell phone financial transaction procedure to the payment of transit fares, focusing on bus transit. For these transactions, the cell phone effectively functions as a contactless Smart Card. Unlike a contactless Smart Card, however, the user (rider) does not have to hold a card in close proximity to a card reader. The cell phone's ability to separate the fare transaction from the act of boarding the bus reduces the queuing time compared with the use of contact or contactless Smart Cards, or the payment of cash. This application of the procedure offers a greater number of payment options to customers, ranging from debiting a prepaid account with the transit operator or the mobile phone company, to debiting a credit card or bank account, to adding the fare charge to the mobile phone bill.

The use of this procedure requires a service arrangement between the transit operator and the mobile phone service provider. This agreement would set transaction charges for the use of cell phones to collect fares (and who pays them).

The agreement would establish the destination financial account to which payments to the transit operator would be credited. It would also determine the unique transaction code system for users (riders) to enter into their cell phones. The transit operator's fare structure would be entered into the mobile phone service provider's CPU and electronically accessible for updating. This fare structure could be variable by time of day, route, type of rider (for example, discount pass holder/senior citizen), day of the week, and approximate distance traveled (zones).

This application of the procedure may also require revised or additional signage age at transit stops to let the user (rider) know the route number and, if needed for distance charges, a location number of the bus stop. The route number must also be displayed on the bus, along with a bus ID number, if desired by the transit operator for management purposes.

This information is built into the unique transaction code the user enters into his/her cell phone as the bus approaches (or after getting on the bus, if the operator has an honor system). For a transit operator who does not have fares based on zones or distance traveled, the unique transaction code might be *DT37, meaning a function key (*)+vendor code (here, DT for Delaware Transit)+route number (37). Any variable pricing by time, day of the week, or discount pass would be automatically calculated by the mobile phone service provider's CPU.

In this case, the user would enter the unique transaction code (*DT37) and press "SEND." The unique transaction code is transmitted to the mobile phone service provider's CPU, which records the user's identity (and knows if the user is a discount pass holder), the date and time, approximate location (by receiving cell), and the transaction type—here—"boarded Route 37 bus." The CPU would calculate the fare amount and display it with an "OK?" prompt. The user presses "SEND" and the computer displays a transaction confirmation/authorization number or message on the cell phone. As the user (rider) boards the bus, he/she shows this message or number to the driver, much like a "Flash Pass." The user then presses "END" to clear the cell phone. Users who make a transfer during the trip can press the function key (*) and the "recall" button to re-display the transaction confirmation/authorization number/message to show the driver of the next bus.

If the transit operator uses a fare structure which includes zone or distance charges, then signage at the transit stop must include a location code for the stop, plus a map or list of destinations on the route and their location codes. Further, let's assume the transit operator wants to know the specific bus in which the user is riding and displays a bus ID number on the bus' marquee. In this case, the unique transaction code might be *DT37526, meaning a function key (*)+ vendor code (DT for Delaware Transit)+route number (37)+ origination point (here, zone 5) +destination point (here, zone 2)+bus ID number (#6 on this route). The user can enter all elements of the transaction code, except for the bus ID number, prior to the arrival of the bus.

The billing process will depend upon the agreement between the transit operator and the mobile phone service provider. If the transit operator has a pre-paid account or discount pass program, the user's fare charge could be debited from that account by the mobile phone service provider's CPU. Otherwise, fare charges could be credited by the CPU to a pre-authorized financial account. The user's charges could be added to his/her mobile phone bill and reflected on the periodic statement, plus any phone usage or transaction fees applicable. Alternatively, the service agreement between the user and the mobile phone service provider could authorize these transactions to be debited from a linked financial account, be it a bank account or a credit card.

In either case, the user's mobile phone statement would reflect the date and time of the transaction.

Cell Phone Tolling Procedure

This procedure is a more specific application of the procedure used to conduct financial transactions via cellular phone described above. It allows the collection of tolls from vehicles using a facility at any speed. The procedure does not require a toll plaza or other physical structure, collection personnel, or hardware. However, traffic counting tubes, human spotters, and/or video cameras would be required for enforcement and revenue/traffic reconciliation.

The cell phone in this case functions as an active transponder communicating with a cell antenna, or a dedicated roadside receiver, which is connected by land line to the mobile phone service provider CPU. The cell phone also functions as an electronic wallet (or contactless Smart Card), transferring funds from the user's account to the tolling authority and recording the transaction.

Figure 2B:
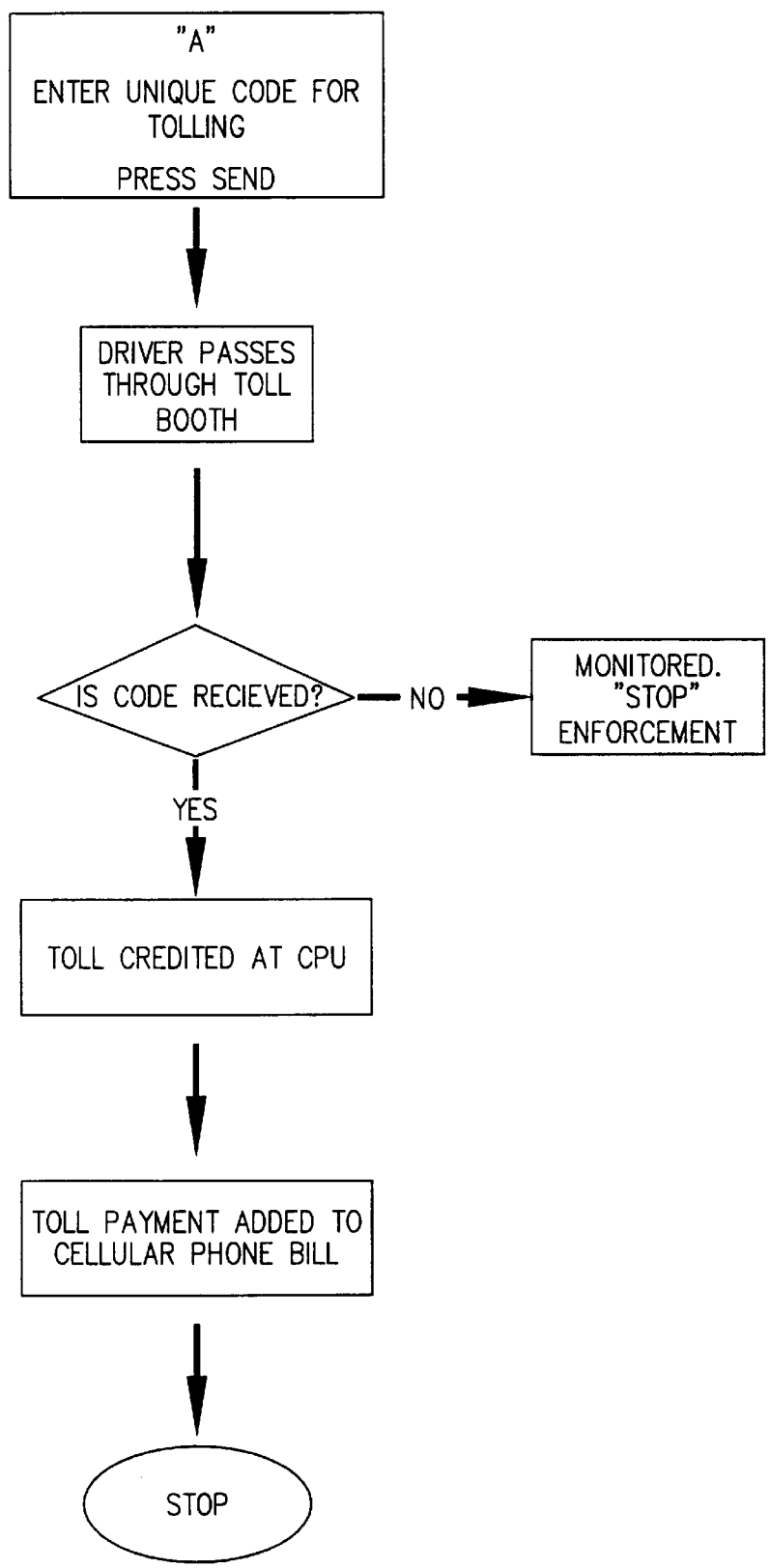
Figure 3A:
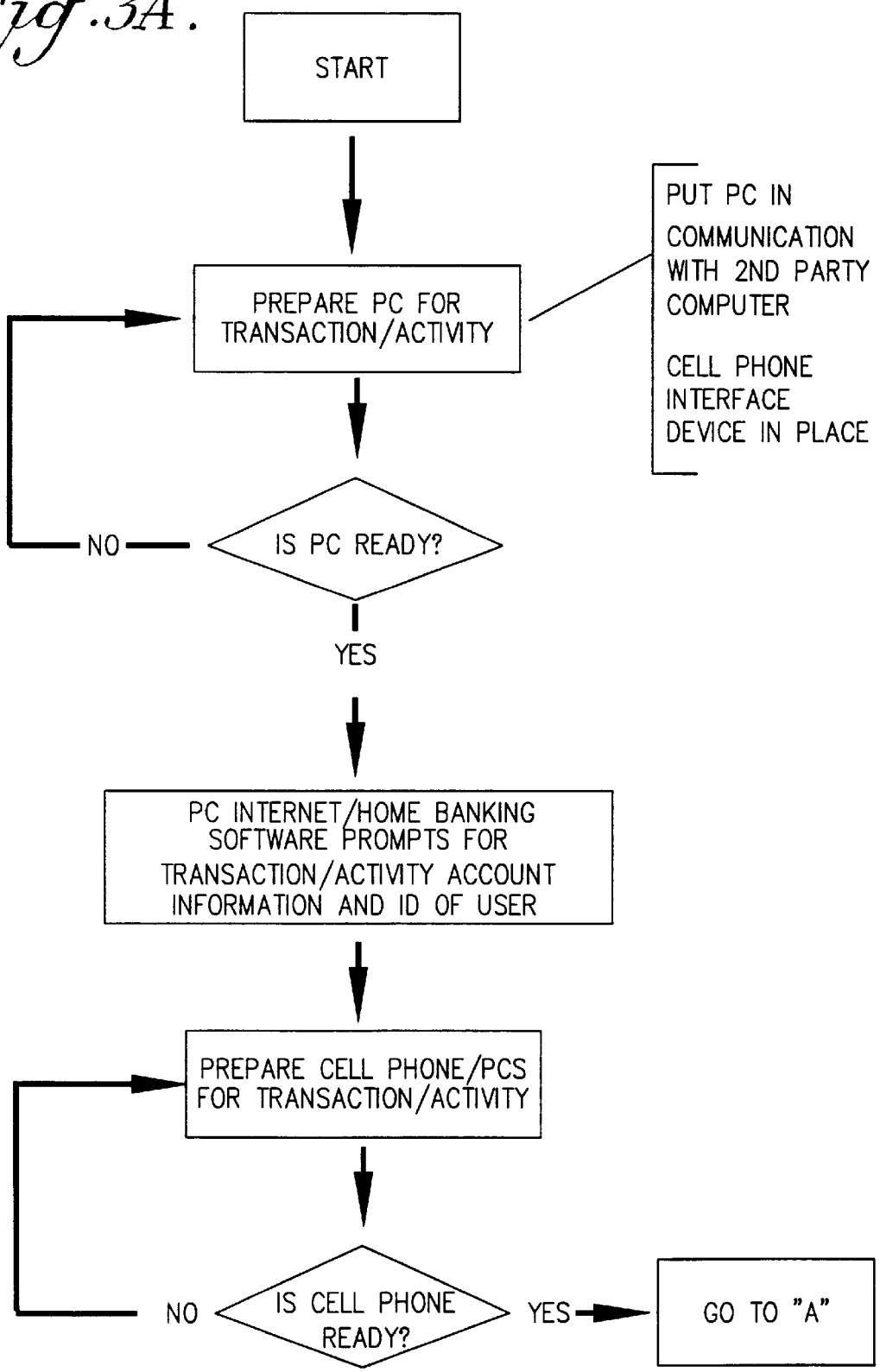
Figure 3B:
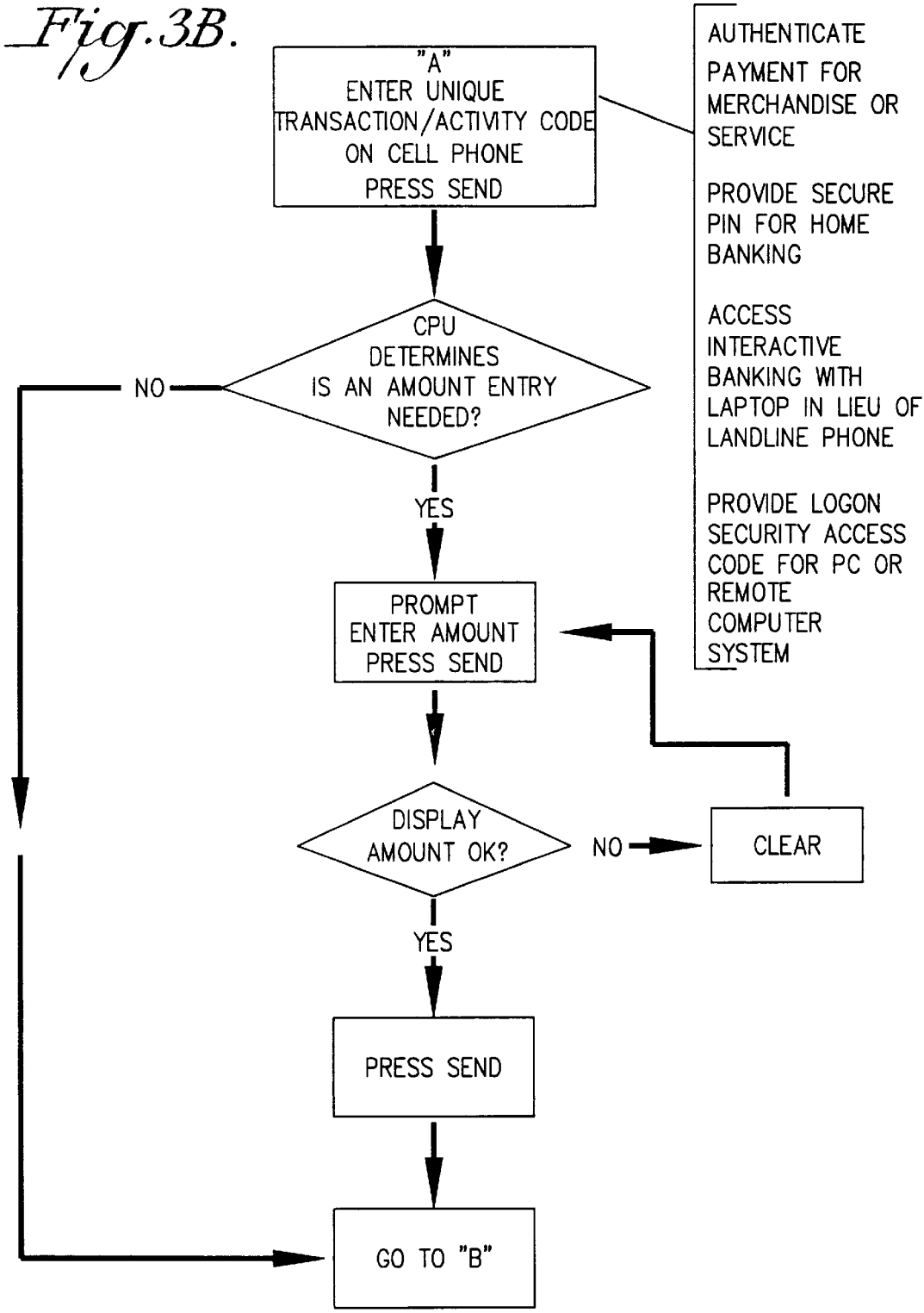
Figure 3C:
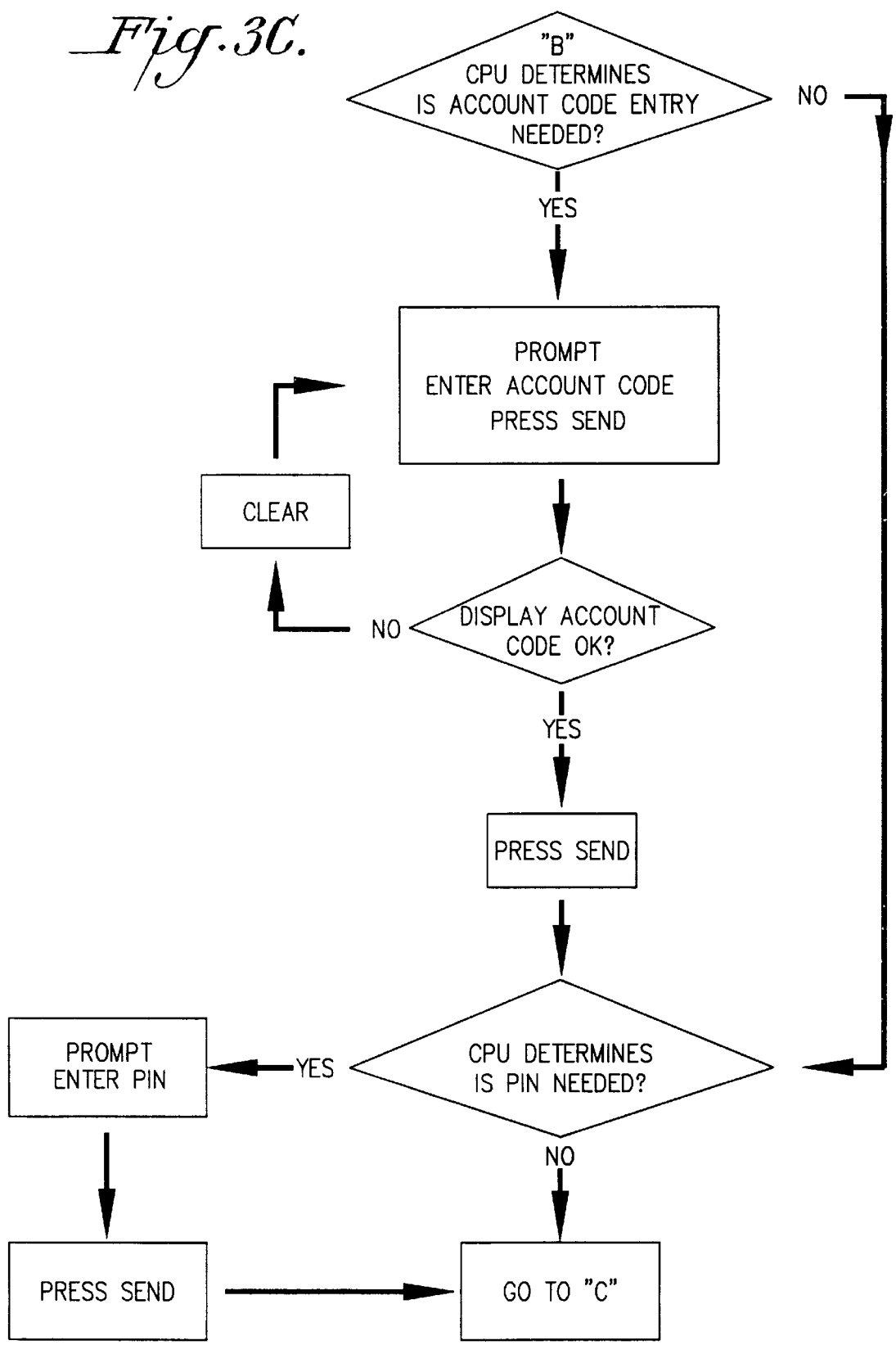
Figure 3D:
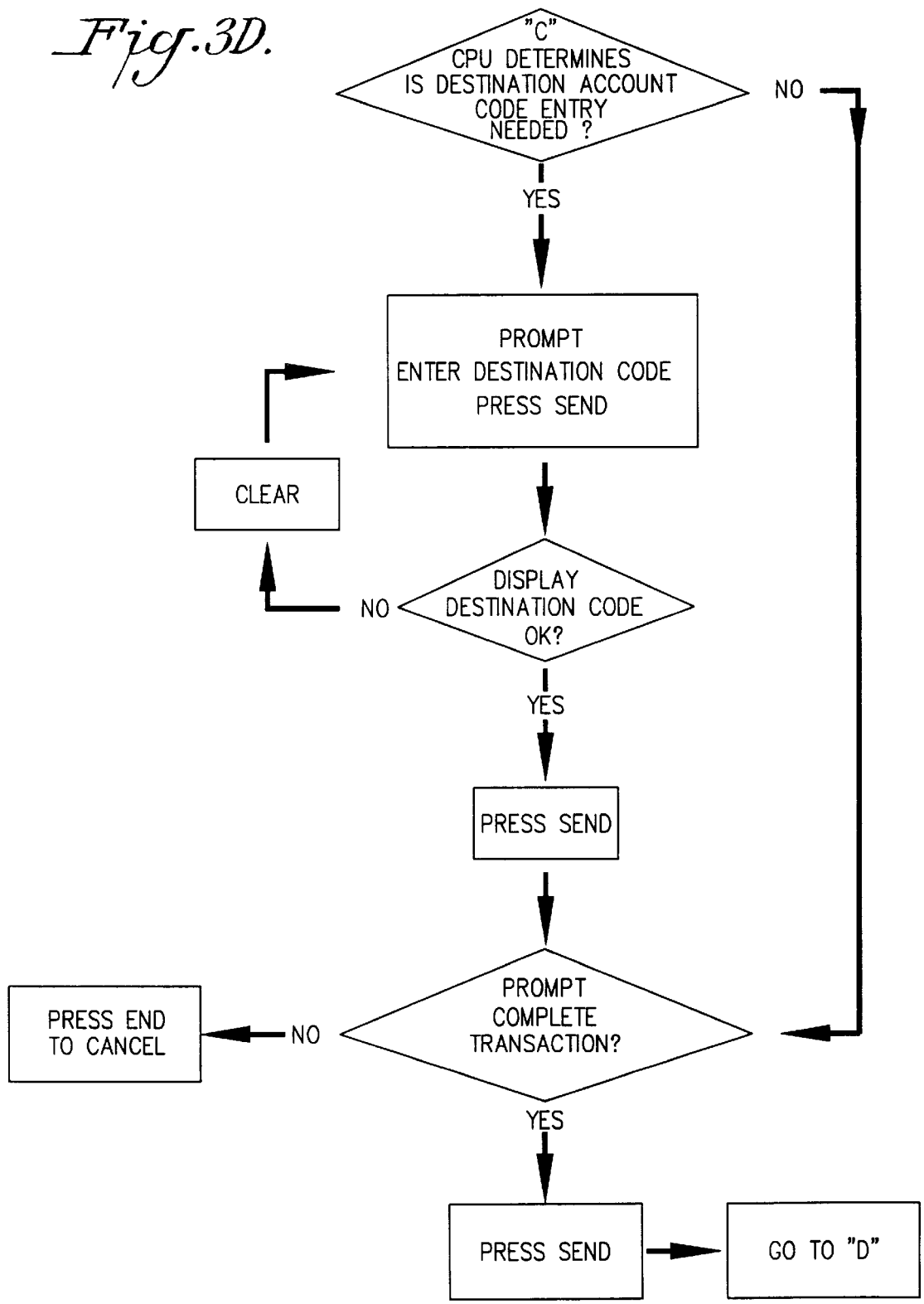

Referring to FIGS. 2A and 2B, in this procedure the driver is notified by road signage that cell phone tolling is ahead and is directed to particular lanes set aside for such use to maximize through-put. The user turns on, or otherwise clears the cell phone for tolling. Signage informs the driver of the appropriate unique function code for the particular facility or toll plaza, which the user enters into the cell phone. As the driver approaches the toll collection area, he presses "SEND" to transmit the function code and pay the toll. (If the toll is high, or there are other transaction security concerns, the procedure may call for the mobile phone service provider's CPU to prompt the user to enter a PIN and press "SEND.") The driver may be instructed to press "SEND" at a particular point to facilitate visual or RF detection enforcement.

The CPU receives the function code, matches it with the mobile phone making the call (via data sub-channel) and confirms the transaction to the user's cell phone by LED display of the amount of the toll and/or generating a tone. The user presses "END" after confirmation to clear the phone for other use. The CPU charges the toll amount and any phone usage or transaction fees to the user's mobile phone account. By prior arrangement between the user and the mobile phone service provider, another linked financial account could be the default account for toll charges. The recorded transaction would be reflected on the user's mobile phone (or other financial account) bill. Depending upon the agreement between the user and the mobile phone service provider, the charges could be treated as a credit transaction or could be debited against a pre-paid (stored value) deposit and so reflected on the mobile phone bill.

Personal Computer Transaction Authentication/
Security Procedure and PC/Cell Phone Interface
Device Description This procedure describes the use of a cellular telephone in conjunction with a PC to provide transaction security for purchases (financial transfers) made via the Internet or other interactive on-line transaction system. Under this procedure the cellular phone functions as a "PIN pad," providing authorization and authentication of funds transfers, without sending credit card account numbers over the Internet or relying upon potentially "hackable" computer software encryption to prevent unauthorized access to financial account numbers. This procedure requires that, unless the PC modem is using a cellular telephone to communicate, an interface device be connected to the personal computer, or installed internally, which allows communication between a cellular telephone and the PC via a PCMIA cord connection. Also required are software add-ons to Net browsers, virtual banking, or other interactive financial programs to provide user information and prompts consistent with the cell phone transaction/activity procedures.

The external (add-on) cell phone/PC interface device plugs directly into the PC's telephone jack and has a female receptacle for the phone cord to the wall jack or external modem. It also has a pin connector for a PCMIA cord to connect to the cellular phone. The device's circuitry is functional only when an active cell phone is connected to it via PCMIA cord. Otherwise, it is benign, allowing normal modem communications. When functioning, the device circuitry allows the cell phone to communicate with the computer and modem.

Referring to FIGS. 3A–3F the user decides to execute an on-line transaction via computer, such as purchase from an Internet vendor, pay bills electronically, or interact with a remote secure-access computer. The personal computer is in communication with a second party's computer, the desired transaction or activity has been selected on the PC, and any needed price and destination account/access code is displayed. For example, the computer displays the vendor's account code number or telephone account number to which funds will be transferred and prompts the user to enter the unique function code on his cellular phone, which has been activated and cleared, but not yet connected to the interface device.

The user activates and clears the cell phone. User enters the function code and presses "SEND." If the transaction/ activity involves a payment and unless there is a default amount associated with the selected function, the mobile service provider CPU prompts the user cell phone to enter the amount of the transaction and "SEND." The CPU confirms amount and asks "OK?" User presses "SEND" to continue or "CLEAR" to reenter. The mobile service provider CPU determines which linked accounts are pre- authorized for access under this function and displays either a default source account code to be debited (such as the customer's mobile phone account), or prompts for a unique account code representing a specific credit card, debit card, bank, or other financial account. These accounts are linked by pre-authorization agreement to the user's mobile phone account. The menu codes for each account are selected by the user and programmed into the CPU at the time service is established (or later modified). The user enters the desired account code and presses "SEND." The CPU determines if a PIN is required for the transaction and prompts for it. The user enters the PIN and presses "SEND."

The mobile phone service provider CPU next prompts for a destination account code number. This may be a unique vendor code, assigned by agreement with the mobile phone service provider, a unique account code (in the case of an inter-account transfer by a single party), or the mobile phone number of the recipient. This account code or phone number is displayed on the computer screen by the Internet vendor or interactive banking program. The user enters the destination account code on the cell phone and presses "SEND." The mobile phone service provider's CPU then prompts "OK to complete transaction?" User presses "SEND" on the cell phone to complete the actual transaction or "END" to cancel. The CPU confirms completion of the transaction by generating and displaying displays a transaction confirmation/authorization code number.

The user now connects the cellular phone to the cell phone/PC interface device with a PCMIA cord and presses "SEND" on the cellular phone key pad to transmit the confirmation/authorization code number through the interface device to the computer and via the modem to the receiving party. The user then disconnects the cellular phone from the interface device and presses "END" to clear the phone. The user closes out the PC software program, terminates the Internet or on-line connection, or prepares for another transaction/activity.

Transmitting the transaction confirmation/authorization code number provides the vendor with independently generated real-time confirmation that an authorized transaction has taken place. Neither the actual originating (debited) account/access number, the actual destination (credited) account/access number, nor the user's PIN are sent over the Internet and possibly intercepted.

An unauthorized user with cloned cellular phone would still need to know the unique function codes, the account codes, and the PIN in order to complete a transaction and have the mobile phone service provider CPU generate a confirmation number. A hacker who might gain access to an unattended PC would find no account numbers or PIN record on the hard drive. The cell phone has in effect served as a stand-alone PIN pad and the actual transaction has taken place offline.

What is claimed is:

1. A method of transferring funds between different accounts comprising the steps of expanding the function of a service provider's central processing unit to include account and authorization information, entering a function code on the keypad of a cellular phone or other wireless communication device, sending the function code to the central processing unit of the provider which identifies the desired transaction, determining at the central processing unit whether a personal identification number is needed, and supplying the central processing unit with the personal identification number if needed, authorizing the desired transaction, determining the different accounts involved in the transaction, and confirming completion of the transaction.

2. A method of transferring funds between different accounts as in claim 1 wherein the desired transaction involves a default amount at a pre-set price.

3. A method of transferring funds between different accounts as in claim 1 wherein the desired transaction involves a variable amount, identifying the variable amount, and sending it to the central processing unit.

4. A method of verifying identity and authorizing access to a secured location comprising the steps of expanding the function of a service provider's central processing unit to include secure independent verification of a user's identity, entering a function code on the keypad of a cellular phone or other wireless communication device, sending the function code to the central processing unit of the provider which identifies the desired transaction as access to the secured location, determining at the central processing unit whether a personal identification number is needed, and supplying the central processing unit with the personal identification number if needed, authorizing the desired transaction, and confirming completion of the transaction.

5. A method of verifying identity and authorizing access to a secured location as in claim 4 wherein the step of authorizing the desired transaction includes communication with the secured location, and activation of the secured location to grant or deny access thereto.

6. A method of transferring funds between different accounts comprising the steps of expanding the function of a service provider's central processing unit to include account and authorization information, transmitting a function code of a cellular phone or other wireless communication device to the central processing unit of the provider which identifies the desired transaction, determining at the central processing unit whether a personal identification number is needed, and supplying the central processing unit with the personal identification number if needed, authorizing the desired transaction, determining the different accounts involved in the transaction, and confirming completion of the transaction.

7. A method of transferring funds between different accounts as in claim 6 wherein the desired transaction involves a default amount at a pre-set price.

8. A method of transferring funds between different accounts as in claim 6 wherein the desired transaction involves a variable amount, identifying the variable amount, and sending it to the central processing unit.

* * * * *

UNITED STATES PATENT AND TRADEMARK OFFICE
CERTIFICATE OF CORRECTION

PATENT NO. : 5,991,749
DATED : November 23, 1999
INVENTOR(S) : Paul H. Morrill

It is certified that error appears in the above-identified patent and that said Letters Patent is hereby corrected as shown below:

Column 9, line 12, delete "age".

Column 12, line 32 (claim 1, line 4), after "information" insert - - identifying the user by sending the user identification information on the subchannel of a cellular phone or other wireless communication device - -; and line 33 (claim 1, line 5) delete "a" and insert - - the - -.

Column 12, line 54 (claim 4, line 4), after "identify" insert - - by sending the user identification information on the subchannel of a cellular phone or other wireless communication device - -; and line 55 (claim 4, line 5) delete "a" and insert - - the - -.

Signed and Sealed this

Nineteenth Day of September, 2000

Attest:

Q. TODD DICKINSON

*Attesting Officer*　　　*Director of Patents and Trademarks*